(12) United States Patent
Eilos (10) Patent No.: US 10,011,785 B2
(45) Date of Patent: Jul. 3, 2018

(54) INTEGRATED PROCESS FOR PRODUCING HYDROCARBONS

(71) Applicant: UPM-Kymmene Corporation, Helsinki (FI)

(72) Inventor: Isto Eilos, Porvoo (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 15/035,873

(22) PCT Filed: Nov. 20, 2014

(86) PCT No.: PCT/FI2014/050889
§ 371 (c)(1),
(2) Date: May 11, 2016

(87) PCT Pub. No.: WO2015/075315
PCT Pub. Date: May 28, 2015

(65) Prior Publication Data
US 2016/0289576 A1     Oct. 6, 2016

(30) Foreign Application Priority Data
Nov. 21, 2013   (FI) ..................................... 20136163

(51) Int. Cl.
*C10G 3/00*        (2006.01)
*C01B 3/38*        (2006.01)
(Continued)

(52) U.S. Cl.
CPC ................ *C10G 65/00* (2013.01); *C01B 3/38* (2013.01); *C01B 3/48* (2013.01); *C10G 3/50* (2013.01);
(Continued)

(58) Field of Classification Search
CPC ...... C10G 3/00–3/62; C01B 3/38–3/44; C01B 3/48
See application file for complete search history.

(56) References Cited

U.S. PATENT DOCUMENTS 5,705,722 A      1/1998   Monnier et al.
7,850,944 B2 *  12/2010   Genkin .................. C01B 3/384
                                                                  423/650
(Continued)

FOREIGN PATENT DOCUMENTS

WO      2009038965 A1     3/2009
WO      2009059936 A2     5/2009
(Continued)

OTHER PUBLICATIONS

International Search Report dated May 7, 2015; International Application No. PCT/FI2014/050889; International Filing Date Nov. 20, 2014 (3 pages).
(Continued)

*Primary Examiner* — In Suk C Bullock
*Assistant Examiner* — Alyssa L Cepluch
(74) *Attorney, Agent, or Firm* — Cantor Colburn LLP (57) ABSTRACT

The present invention relates to an integrated process for producing hydrocarbons, wherein feedstock originating from renewable sources is subjected to catalytic hydroprocessing followed by separation of an aqueous component, a heavy component, and a light component, separating carbon dioxide and hydrogen sulfide from said light component to obtain a recycle stream, followed by dividing the recycle stream to a first recycle stream and a second recycle stream, directing the first recycle stream to the hydroprocessing system, and the second recycle stream to a hydrogen plant, where the light component is converted to hydrogen, and directing the hydrogen to the hydroprocessing system.

26 Claims, 1 Drawing Sheet (51) Int. Cl.
*C01B 3/48* (2006.01)
*C10G 65/00* (2006.01)

(52) U.S. Cl.
CPC ............... *C01B 2203/0227* (2013.01); *C01B 2203/0233* (2013.01); *C01B 2203/0283* (2013.01); *C01B 2203/043* (2013.01); *C01B 2203/047* (2013.01); *C01B 2203/062* (2013.01); *C01B 2203/1058* (2013.01); *C01B 2203/1082* (2013.01); *C01B 2203/1205* (2013.01); *C01B 2203/127* (2013.01); *C01B 2203/1235* (2013.01); *C01B 2203/1241* (2013.01); *C01B 2203/1247* (2013.01); *C01B 2203/148* (2013.01); *C10G 2300/104* (2013.01); *C10G 2300/1011* (2013.01); *C10G 2300/1014* (2013.01); *Y02P 20/125* (2015.11); *Y02P 30/20* (2015.11)

(56) References Cited

U.S. PATENT DOCUMENTS

| | | | |
|---|---|---|---|
| 8,324,438 B2 * | 12/2012 | Brandvold | ............. C10G 69/00 208/15 |
| 9,024,095 B2 | 5/2015 | Knuuttila et al. | |
| 2008/0281134 A1 | 11/2008 | Ghonasgi et al. | |
| 2009/0158637 A1 | 6/2009 | McCall et al. | |
| 2009/0300971 A1 | 12/2009 | Abhari et al. | |
| 2010/0043279 A1 | 2/2010 | Abhari et al. | |
| 2012/0203044 A1 | 8/2012 | Preau | |

FOREIGN PATENT DOCUMENTS

| | | |
|---|---|---|
| WO | 2009152873 A1 | 12/2009 |
| WO | 2013131916 A1 | 9/2013 |

OTHER PUBLICATIONS

Written Opinion dated May 7, 2015; International Application No. PCT/FI2014/050889; International Filing Date Nov. 20, 2014 (7 pages).

Ancheyta et al. "Hydroprocessing of Heavy Oils and Residua", CRC Press, publ. 2007: 9 pages.

Jones et al., "Process Design and Economics for the Conversion of Lignocellulosic Biomass to Hydrocarbon Fuels", U.S. Department of Energy Bioenergy Technologies Office, PNNL-23053, Publ. Nov. 1, 2013; 99 pages.

Jones et al., "Production of Gasoline and Diesel from Biomass via Fast Pyrolysis, Hydrotreating and Hydrocracking: A Design Case", U.S. Department of Energy, PNNL-18284, published Feb. 25, 2009; 77 pages.

* cited by examiner

INTEGRATED PROCESS FOR PRODUCING HYDROCARBONS

CROSS-REFERENCE TO RELATED APPLICATIONS

This application is a National Stage application of PCT/FI2014/050889, filed Nov. 20, 2014, which claims the benefit of Finnish Application No. 20136163, filed Nov. 21, 2013, both of which are incorporated by reference herein in their entirety.

FIELD OF THE INVENTION

The present invention relates generally to hydroprocessing of feedstocks originating from renewable sources, for producing hydrocarbons useful as liquid fuels or fuel blending components, where said hydroprocessing is integrated with a hydrogen plant comprising a steam reformer unit, a desulfurization unit upstream from the steam reformer unit, and a water gas shift unit. Light gaseous compounds, separated and/or formed during the hydroprocessing, are recycled to the desulfurization unit upstream from the steam reformer.

BACKGROUND OF THE INVENTION

There is an increasing need for biofuels, suitable as liquid fuels as such, particularly transportation fuels or compatible with said fuels. Biofuels are typically manufactured from feedstocks originating from renewable sources including oils and fats from plants, animals, algae, fish and various waste streams and sewage sludge. The common feature in these feedstocks is that they are composed of glycerides and free fatty acids, both of these containing aliphatic carbon chains having from about 8 to about 24 carbon atoms and the aliphatic carbon chains being saturated, or mono-, di- or polyunsaturated. Catalytic hydroprocessing of these materials requires large quantities of hydrogen, and this is a major operating cost in the production of biomass-derived fuels by catalytic hydroprocessing. Further, it is generally more difficult to convert low quality feedstocks of more heterogeneous nature and containing contaminants by catalytic hydroprocessing, or more complicated equipment is required.

Recycling of excess hydrogen to hydroprocessing is commonly used in hydroprocessing. Hydroprocessing of heterogeneous feedstocks originating from renewable sources produces light hydrocarbons as unwanted byproducts. Light hydrocarbons are separated in the course of the process from the process liquid in gas separation, where hydrogen is separated and recycled to the hydroprocessing reactor.

Typically, in a continuously operating process light hydrocarbons, particularly methane is concentrated in the hydrogen recycle stream, which results in the reduction of hydrogen partial pressure in said stream and, further, via that reduction also the hydrogen partial pressure in the hydroprocessing reactor(s) is reduced. For achieving required product properties, such as specific diesel grade, significant amounts of hydrogen make-up gas are necessary for maintaining required hydrogen partial pressure. As methane does not significantly react at hydroprocessing temperatures, it will build up in hydrogen recycle streams. Thus high hydrogen purge to flare is required for producing high value products.

Hydrogen is typically supplied to hydroprocessing processes from a hydrogen plant operating most commonly by steam reforming. In hydrogen plants, in the steam reforming process (typically SMR=steam methane reforming) usually natural gas, liquefied petroleum gas (LPG) gas or naphtha is used as starting material. Methane (and other light hydrocarbons) in the starting material react at elevated temperatures in the presence of a nickel based catalyst with steam to yield synthesis gas containing carbon monoxide and hydrogen, followed by water gas shift reaction at a lower temperature, where said carbon monoxide reacts with water to produce carbon dioxide and hydrogen. The catalysts in the hydrogen plant do not tolerate any sulfur and thus sulfur removal reactors are arranged upstream from the reformer. In said sulfur removal (desulfurization) reactors high molecular weight sulfur compounds are hydrogenated to hydrogen sulfide, followed by treating with absorption beds for removing the hydrogen sulfide. This requires hydrogen, which is typically obtained from the hydrogen plant and consumes thus hydrogen.

The control and adjusting of hydrogen production capacity from the hydrogen plant is very slow because of the high temperature nature of said plant. This means that in practice the hydrogen plant is operated to continuously provide an excess of hydrogen and the hydrogen which is not consumed is directed to flare and wasted.

Despite the ongoing research and development of processes for the manufacture of liquid fuels, there is still a need to provide an improved process for producing hydrocarbons useful as liquid fuels or fuel blending components.

SUMMARY OF THE INVENTION

The present invention relates to an integrated process for producing hydrocarbons, useful as liquid fuels or fuel blending components, wherein catalytic hydroprocessing is integrated with a hydrogen plant comprising a steam reformer unit, a desulfurization unit upstream from the steam reformer unit, and a water gas shift unit. Light gaseous compounds, separated and/or formed during the hydroprocessing, are directed to the hydrogen plant, to the desulfurization unit comprising sulfur removal reactor(s) upstream from the steam reformer unit, for converting sulfur compounds and removing of them, followed by directing the desulfurized light compounds to the steam reformer unit and then to water gas shift unit to obtain hydrogen, which is directed to hydroprocessing. In said process feedstocks originating from renewable sources are converted to liquid fuels and fuel blending components, useful as transportation fuels or as blending components in said fuels.

Particularly an integrated process for producing hydrocarbons is provided, said process comprising the steps of subjecting feedstock originating from renewable sources to catalytic hydroprocessing in a hydroprocessing system in the presence of hydrogen, followed by separation of an aqueous component, a heavy component comprising hydrocarbons having carbon number more than 5, and a light component comprising gases and hydrocarbons having carbon number from 1 to 5, directing said light component to separation for removal of carbon dioxide and hydrogen sulfide to obtain a recycle stream comprising hydrogen and hydrocarbons having carbon number from 1 to 5, followed by dividing the recycle stream to a first recycle stream and a second recycle stream, directing the first recycle stream to the hydroprocessing system, and the second recycle stream to a hydrogen plant comprising a steam reformer unit, a desulfurization unit upstream the steam reformer unit, and water gas shift unit, converting said hydrocarbons having carbon number from 1 to 5 in said hydrogen plant to hydrogen, and directing a hydrogen stream comprising said hydrogen to the hydroprocessing system.

The hydroprocessing system comprises at least one main reaction phase, where the hydroprocessing reactions take place, and additional optional pre-processing phases upstream the main reaction phase and optional post-processing phases downstream the main reaction phase.

Said catalytic hydroprocessing may be carried out in one stage or more stages.

A hydroprocessing product is obtained from the catalytic hydroprocessing, said product comprising an aqueous component, a heavy component comprising hydrocarbons having carbon number more than 5, and a light component comprising gases and hydrocarbons having carbon number from 1 to 5, as described above.

Said catalytic hydroprocessing may be carried out in a hydroprocessing reactor system comprising one or more reactors.

Hydrogen consumption can thus be decreased, because in the hydrogen plant at least part of fresh hydrogen needed for the sulfur removal is replaced with recycle hydrogen from the hydroprocessing, and further, the light hydrocarbons and particularly methane formed in the hydroprocessing are utilized as starting material in the hydrogen plant for producing of hydrogen for the integrated process. The need for fresh hydrogen may thus be significantly decreased.

The invention also provides an integrated process for converting hydrocarbons having carbon number from 1 to 5 to hydrogen, wherein said process comprises the steps where feedstock originating from renewable sources is subjected to catalytic hydroprocessing in a hydroprocessing system in the presence of hydrogen, followed by separation of an aqueous component, a heavy component comprising hydrocarbons having carbon number more than 5, and a light component comprising gases and hydrocarbons having carbon number from 1 to 5, directing said light component to separation for removal of carbon dioxide and hydrogen sulfide to obtain a recycle stream comprising hydrogen and hydrocarbons having carbon number from 1 to 5, followed by dividing the recycle stream to a first recycle stream and a second recycle stream, directing the first recycle stream to the hydroprocessing system, and the second recycle stream to a hydrogen plant comprising a steam reformer unit, a desulfurization unit upstream the steam reformer unit, and water gas shift unit, and converting said hydrocarbons having carbon number from 1 to 5 in said hydrogen plant to hydrogen.

The present invention also relates to products obtainable by said processes.

Thus an object of the invention is to provide an integrated process for effectively and economically converting feedstock originating from renewable sources to liquid fuels, suitably transportation fuels and blending components for said fuels, whereby the consumption of hydrogen can be decreased.

Another object of the invention is to provide an integrated process for effectively and economically converting feedstock originating from renewable sources to liquid fuels, suitably transportation fuels and blending components for said fuels, whereby the carbon dioxide emissions can be decreased.

A still further object of the invention is to provide an integrated process for converting hydrocarbons having carbon number from 1 to 5 to hydrogen.

Characteristic features of the invention are presented in the appended claims.

DEFINITIONS

The term "hydroprocessing" refers here to catalytic processing of feedstock originating from renewable sources by all means of molecular hydrogen.

The term "hydrotreatment" refers here to a catalytic process, which removes oxygen from organic oxygen compounds as water (hydrodeoxygenation, HDO), sulfur from organic sulfur compounds as dihydrogen sulfide (hydrodesulfurisation, HDS), nitrogen from organic nitrogen compounds as ammonia (hydrodenitrogenation, HDN) and halogens, for example chlorine from organic chloride compounds as hydrochloric acid (hydrodechlorination, HDCl).

The term "deoxygenation" refers here to the removal of oxygen from organic molecules, such as carboxylic acid derivatives, alcohols, ketones, aldehydes or ethers.

The term "hydrodeoxygenation" (HDO) refers to the removal of carboxyl oxygen as water by the means of molecular hydrogen under the influence of catalyst.

The term "decarboxylation" and/or "decarbonylation" refers here to the removal of carboxyl oxygen as $CO_2$ (decarboxylation) or as CO (decarbonylation) with or without the influence of molecular hydrogen.

The term "hydrocracking" refers here to catalytic decomposition of organic hydrocarbon materials using molecular hydrogen at high pressures.

The term "hydrodewaxing" refers here to catalytic treatment of organic hydrocarbon materials using molecular hydrogen at high pressures to reduce the wax content by isomerization and/or cracking.

The term "hydrogenation" means here saturation of carbon-carbon double bonds by means of molecular hydrogen under the influence of a catalyst.

The term "neutral components" or "neutral fraction" or "neutral materials", refers here to all neutral organic components in heavy fractions or residues obtained in treating or processing material of biological origin. Examples of said materials of biological origin are tall oil pitch and tall oil materials. Examples of neutral components contained for example in tall oil pitch include sterols, stanols, sterol and stanol esters, polymeric acids, polymeric neutral substances, dimers, trimers, lignin derivatives, resin acids and fatty acids and esters thereof.

The term "unsaponifiable matter" refers here to substances which cannot be saponified by caustic treatment, such as higher aliphatic alcohols, sterols, and hydrocarbons.

Transportation fuels refer to fractions or cuts or blends of hydrocarbons having distillation curves standardized for fuels, such as for diesel fuel (middle distillate from 160 to 380° C., EN 590), gasoline (40-210° C., EN 228), aviation fuel (160 to 300° C., ASTM D-1655 jet fuel), kerosene, naphtha, etc.

Liquid fuels are hydrocarbons having distillation curves standardized for fuels.

DETAILED DESCRIPTION OF THE INVENTION

It was surprisingly found that several advantageous effects may be achieved when utilizing an integrated process for producing hydrocarbons from feedstock originating from renewable sources, wherein catalytic hydroprocessing is integrated with a hydrogen plant comprising a steam reformer unit, a desulfurization unit upstream from the steam reformer unit, and a water gas shift unit.

Accordingly, an integrated process for producing hydrocarbons is provided, wherein said process comprises the steps of subjecting feedstock originating from renewable sources to catalytic hydroprocessing in a hydroprocessing system in the presence of hydrogen, followed by separation of an aqueous component, a heavy component comprising hydrocarbons having carbon number more than 5, and a light component comprising gases and hydrocarbons having carbon number from 1 to 5, directing said light component to separation for removal of carbon dioxide and hydrogen sulfide to obtain a recycle stream comprising hydrogen and hydrocarbons having carbon number from 1 to 5, followed by dividing the recycle stream to a first recycle stream and a second recycle stream, directing the first recycle stream to the hydroprocessing system, and the second recycle stream to a hydrogen plant comprising a steam reformer unit, a desulfurization unit upstream the steam reformer unit, and water gas shift unit, converting said hydrocarbons having carbon number from 1 to 5 in said hydrogen plant to hydrogen, and directing a hydrogen stream comprising said hydrogen to the hydroprocessing system.

The second recycle stream is directed to the hydrogen plant and particularly to the desulfurization unit where sulfur compounds are removed before feeding the second recycle stream to the steam reformer unit.

The aqueous component comprises water, turpentine and some water soluble components dissolved therein.

The heavy component comprises hydrocarbons having carbon number more than 5, typically saturated hydrocarbons comprising more than 5 hydrocarbon atoms (>C5), i.e. heavier hydrocarbons, in the molecular structure. Said heavier hydrocarbons are typically liquids at the separation conditions following the hydroprocessing of the present process.

The light component comprises gases and hydrocarbons having carbon number from 1 to 5, typically saturated (C1-C5) hydrocarbons, i.e. saturated hydrocarbons comprising from 1 to 5 carbon atoms in their molecular structure, and gases, such as $H_2$, $H_2S$, $CO_2$, CO etc. Said hydrocarbons are typically gaseous compounds at the separation conditions following the hydroprocessing of the present process.

Figure 1:
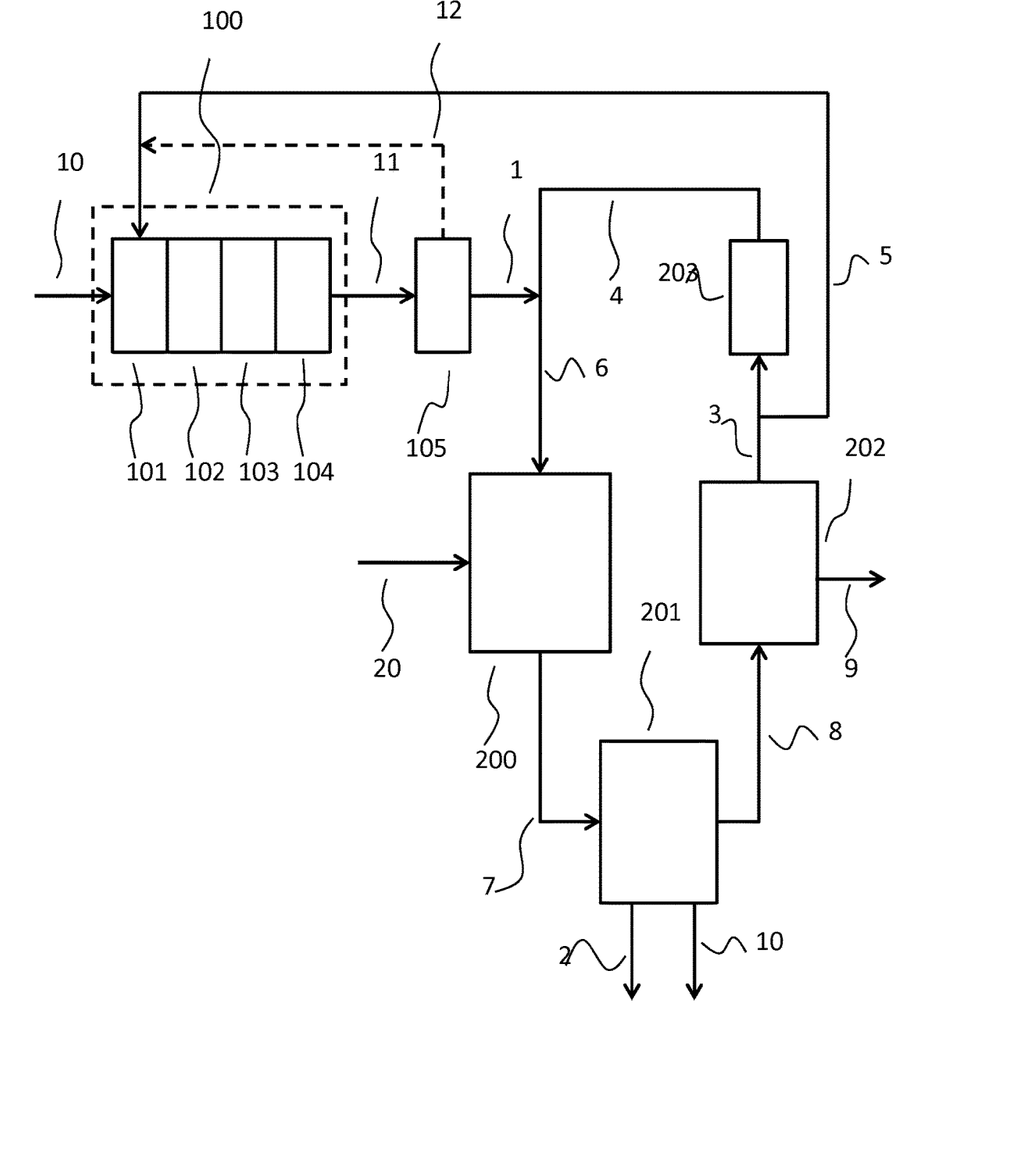
FIG. 1 is a schematic flow diagram representing one embodiment of the integrated process.

A flow diagram of an embodiment of the integrated process of the invention is presented in FIG. 1. Starting material 10 selected from natural gas, biogas, naphtha, LPG, and combinations thereof, usually containing sulfur impurities, is directed to hydrogen plant 100 comprising a desulfurization unit 101, steam reformer unit 102, water gas shift unit 103 and carbon monoxide/carbon dioxide/water separator unit 104. In the hydrogen plant 100 the starting material 10 is subjected to sulfur removal in the desulfurization unit 101, followed by directing the desulfurized starting material to the steam reformer unit 102, where the hydrocarbons in the starting material 10 are converted to hydrogen and carbon dioxide, followed by carrying out water gas shift reaction in the water gas shift unit 103 and removing of carbon dioxide, water and carbon monoxide in the carbon monoxide/carbon dioxide/water separator unit 104, to yield hydrogen stream 11, suitably in essentially pure form. Second recycle stream 5 containing hydrogen and light hydrocarbons (C1-C5), originating from the hydroprocessing reactor system 200 is also directed to the hydrogen plant 100, to the desulfurization unit 101, where hydrogen acts in the desulfurization reaction, and the light hydrocarbons are converted to hydrogen in said hydrogen plant. Hydrogen stream 11 may comprise hydrogen produced from starting material 10 and/or hydrogen produced from recycle stream 5. Stream 11 is directed to compressor 105 to provide hydrogen stream 1, which is combined with first recycle stream 4 derived from hydroprocessing, whereby combined gas stream 6 is formed. Gas stream 6 is directed to the hydroprocessing reactor system 200. Optionally part of the hydrogen stream 11 may be recycled as hydrogen recycle stream 12 to the hydrogen plant, suitably by make-up compressor 105. Feedstock 20, comprising liquid feedstock originating from renewable sources is fed to the hydroprocessing reactor system 200 for hydroprocessing. Hydrogen gas stream 1, from hydrogen plant 100 is combined with first recycle stream 4 containing hydrogen, light hydrocarbons and controlled amount of methane and sulfur compounds, such as hydrogen sulfide, to form combined stream 6, which is directed to the hydroprocessing reactor system 200. Stream 4 may contain sulfur compounds, and feedstock 20 may contain sulfur compounds. If necessary, sulfur compounds may be added to stream 1 or 6. The hydroprocessed product, stream 7, from the hydroprocessing reactor system 200 is directed to a separator 201, such as cold separator, where separation of an aqueous component, i.e. stream 10 containing water, a heavy component, i.e. stream 2 and a light component i.e. stream 8 takes place. Stream 2 comprising the heavy component is directed to fractionation and separation (not shown in the FIGURE), where fractions comprising hydrocarbons boiling in the liquid fuel ranges may be obtained. Stream 8 comprising the light component is directed to a separator 202 for the separation of $H_2S$ and $CO_2$, suitably an amine scrubber, where recycle stream 3 containing hydrogen and light hydrocarbons is separated from stream 9 containing $H_2S$ and $CO_2$. Part of recycle stream 3 is recycled via recycle compressor 203, as first recycle stream 4 to the hydroprocessing reactor system 200, and part is recycled as second recycle stream 5 to the hydrogen plant 100. Any suitable reactor types or configurations and devices may be used.

According to another embodiment of the invention an integrated process is provided for converting hydrocarbons having carbon number from 1 to 5 to hydrogen, wherein said process comprises the steps where feedstock originating from renewable sources is subjected to catalytic hydroprocessing in a hydroprocessing system in the presence of hydrogen, followed by separation of an aqueous component, a heavy component comprising hydrocarbons having carbon number more than 5, and a light component comprising gases and hydrocarbons having carbon number from 1 to 5, directing said light component to separation for removal of carbon dioxide and hydrogen sulfide to obtain a recycle stream comprising hydrogen and hydrocarbons having carbon number from 1 to 5, followed by dividing the recycle stream to a first recycle stream and a second recycle stream, directing the first recycle stream to the hydroprocessing system, and the second recycle stream to a hydrogen plant comprising a steam reformer unit, a desulfurization unit upstream the steam reformer unit, and water gas shift unit, and converting said hydrocarbons having carbon number from 1 to 5 in said hydrogen plant to hydrogen.

Hydrogen Plant

The hydrogen plant comprises a steam reformer unit, a desulfurization unit upstream the steam reformer unit, and water gas shift unit. Sid water gas shift unit is arranged downstream the steam reformer. Suitably said hydrogen plant comprises also a carbon monoxide/carbon dioxide/water separator unit downstream the water gas shift unit.

In the hydrogen plant starting material selected from natural gas, biogas, methane, ethane, butane, propane, naphtha, liquefied petroleum gas (LPG) and any combination thereof is subjected to sulfur removal in the desulfurization unit in the presence of hydrogen and at least one sulfur removal catalyst at conditions effecting sulfur removal. Typically catalysts, such as CoMo, NiMo, optionally comprising ZnO or Ni absorbent particularly for low sulfur contents, may be used. Suitable reaction conditions for CoMo and NiMo catalysts include 300-400° C. temperatures; when absorbents are used lower temperatures of 200-300° C. are more suitable. Pressures of 5-30 bar, suitably ones used also for the steam reforming may be used. Purified recycle stream (second recycle stream) obtained from the hydroprocessing system, containing hydrogen and saturated light hydrocarbons (C1-C5) is used for providing the necessary hydrogen for sulfur removal. Suitably said recycle stream comprises less than 1 ppm of sulfur (calculated as elemental sulfur) for achieving maximum catalyst life time for the steam reformer and water gas shift reactor. The desulfurization unit comprises one or more sulfur removal reactors arranged upstream the steam reformer unit. Sulfur containing compounds, particularly high molecular weight compounds present in the starting material (such as natural gas or LPG) are hydrogenated to hydrogen sulfide, which may be removed by suitable means, for example by absorbing to zinc oxide bed. If necessary, hydrogen make-up stream may be used to supply additional hydrogen to the desulfurization unit.

The desulfurized starting material from the desulfurization unit is directed to a steam reformer unit for conversion of light hydrocarbons, such as methane, to carbon monoxide and hydrogen. Any standard steam reforming reactors and catalysts may be used, such as nickel based catalysts. An example of a suitable catalyst is nickel oxide on a low-silica refractory base. Temperatures of 700-1100° C. and pressures of 5-50 bar are typically used.

The gases exiting the steam reformer unit may then be directed to a water gas shift unit comprising at least one water gas shift reactor where the carbon monoxide is reacted with water to produce additional hydrogen. Any standard water gas shift reactors and catalysts may be used, such as copper based catalysts and ferrochromium based catalysts. Pressures of 5-50 bar, suitably the same as in the steam reformer may be used. The temperature may range between 200 and 400° C., depending on the catalyst. Suitably high temperature catalysts, such as ferrochromium catalysts are used, at 300-400° C. temperatures.

The gases exiting the water gas shift unit are passed through a carbon monoxide/carbon dioxide/water separator unit. Said unit may comprise a pressure swing absorber unit (PSA) or the like, suitable for removing carbon dioxide, carbon monoxide and water, whereby hydrogen is obtained, suitably in essentially pure form. Separated water may be recycled to the steam reformer unit.

The catalysts in the steam reformer unit and water gas shift unit in the hydrogen plant do not tolerate sulfur and thus the desulfurization unit is arranged upstream from the steam reformer. In said desulfurization unit high molecular weight sulfur compounds are hydrogenated to hydrogen sulfide, utilizing the recycle stream (second recycle stream) from the hydroprocessing system. Hydrogen contained in said recycle stream effects the desulfurization, and the light hydrocarbons in said second recycle stream provide for additional starting material source for hydrogen production in the subsequent steam reformer unit. Saturated light hydrocarbons in the second recycle stream are particularly suitable for the steam reforming step.

Feedstock to Hydroprocessing

The feedstock refers here to feedstocks originating from renewable sources, and their combinations, suitably liquid feedstock is used.

The feedstock originating from renewable sources is meant to include here feedstocks other than those obtained from mineral oil or coal.

The feedstock can be any kind of feedstock originating from renewable sources, said renewable sources including plants, animals, algae, fish, microbiological processes, waste streams and side streams, which may originate from processing said feedstocks, and sewage sludge. Feedstocks derived from or obtained from processing of renewable sources include derivatives, waxes and oils, such as canola oil, soy bean oil, corn oil, palm oil, pongamia oil, tall oil, sunflower oil, lard, tallow etc, are examples of suitable feedstocks for producing fuel components. The triglycerides and free fatty acids (FFAs) of the typical plant derived feedstocks or animal fats contain aliphatic hydrocarbon chains in their structure which have from about 8 to about 24 carbon atoms, with a majority of the fats and oils containing high concentrations of fatty acids with 16 and 18 carbon atoms.

Mixtures or co-feeds of feedstocks originating from renewable sources may also be used as the feedstock. Said feedstocks include tall oil resin acids, tall oil pitch, tall oil neutral substances, pyrolysis oil, BTL waxes, used paraffin waxes, and liquids derived from the gasification of biomass or natural gas followed by a downstream liquefaction step such as Fischer-Tropsch technology.

In an embodiment, the renewable feedstock comprises a mixture of plant derived compounds obtained as a by-product from the forest industry. In one embodiment of the invention, the feedstock comprises crude tall oil (CTO), which is derived from the chemical pulping of woods. It is typically composed of a mixture of resin acids, fatty acids, sterols, alcohols, neutral substances, unsaponifiable matter and non-acid materials. In a further embodiment of the invention, the feedstock comprises tall oil components such as tall oil fatty acids (TOFA). A combination of CTO and TOFA may also be used.

The term "crude tall oil" or "CTO" or "tall oil" refers here to a product which is mainly composed of both saturated and unsaturated oxygen-containing organic compounds such as unsaponifiable matter, sterols, resin acids (mainly abietic acid and its isomers), fatty acids (mainly linoleic acid, oleic acid and linolenic acid), fatty alcohols, sterols and other alkyl hydrocarbon derivatives. The handling and cooking of the wood causes break down of the triglyceride structures and hence CTO does not contain any significant amounts of triglycerides. Typically, CTO contains minor amounts of impurities such as inorganic sulfur compounds, residual metals such as Na, K, Ca and phosphorus. The composition of the CTO varies depending on the specific wood species.

The fatty acids of tall oil include mainly palmitic acid, oleic acid and linoleic acid.

The term "tall oil fatty acids" or "TOFA" refers to a product which is obtained from tall oil. Fractional distillation of tall oil provides rosin acids and further reduction of the rosin content provides tall oil fatty acids (TOFA) which consists mostly of oleic acid.

In the present process, the feedstock can be purified before it is subjected to hydroprocessing or it can be utilized in an unpurified form. Purification of the feedstock facilitates the performance of the process of the invention. Purification can be accomplished in any appropriate manner, such as by means of washing with washing liquid, filtering, distillation, degumming, depitching, evaporating etc. Also, a combination of the above mentioned purification methods can be used.

In the process of the invention the liquid feedstock is fed from at least one feed tank to the hydroprocessing reactor system. In an embodiment, the feedstock is purified before entering the reactors. The purification is selected to suit the liquid feedstock in question.

In an embodiment, the whole amount of feedstock or a part of it comprises purified CTO. CTO may be purified using any methods, suitably using evaporative methods, where the purification process conditions are controlled in such a way to recover as much as possible of the neutral components of the tall oil.

The content of harmful substances, such as metal ions, sulfur, phosphorus and lignin residuals in the CTO raw material is reduced by the purification. Purification of the feedstock enhances catalyst performance and lifetime.

Catalytic Hydroprocessing

In the integrated process feedstock originating from renewable sources is subjected to catalytic hydroprocessing in a hydroprocessing system in the presence of hydrogen.

The hydroprocessing comprises at least one main reaction phase, where the hydroprocessing reactions HDO, HDW, HI take place, and additional optional pre-treatment phases upstream the main reaction phase and optional post-treatment phases downstream the main reaction phase.

In said process the optionally purified feedstock is heated if necessary and fed into a hydroprocessing reactor system, where it is subjected to catalytic hydroprocessing in the presence of hydrogen and catalyst(s) capable of effecting hydroprocessing reactions. An aqueous component, a heavy component comprising hydrocarbons having carbon number more than 5, and a light component comprising gases and hydrocarbons having carbon number from 1 to 5 (C1-C5 hydrocarbons), are separated. Said light component is directed to separation for removal of carbon dioxide and hydrogen sulfide to obtain a recycle stream comprising hydrogen and hydrocarbons having carbon number from 1 to 5, followed by dividing the recycle stream to a first recycle stream and a second recycle stream. The first recycle stream is directed to the hydroprocessing system, and the second recycle stream to the hydrogen plant.

The first recycle stream (stream 4 in FIG. 1) is combined with hydrogen (stream 1 in FIG. 1) to obtain a combined stream (stream 6 in FIG. 1). The amount of C1-C5 hydrocarbons in the combined stream is suitable not more than 30% by mole, particularly suitably not more than 20% by mole, particularly 0.1-20% by mole, more particularly 0.1-2% by mole, calculated from the total feed directed to the hydroprocessing system. Thus the accumulation of C1-C5 hydrocarbons, particularly C1-C3 hydrocarbons, such as methane, ethane and propane in the combined stream can be avoided by adjusting the amount of C1-C5 hydrocarbons in the combined stream. No supplemental hydrogen is needed for compensating the partial pressure drop caused by excess C1-C5 hydrocarbons. The hydrogen partial pressure may be maintained in the hydroprocessing at desired levels, suitable at 50 bar or higher.

Said catalytic hydroprocessing may be carried out in one stage where hydrodeoxygenation (HDO) and hydrodewaxing (HDW) are carried out in a hydroprocessing reactor system comprising one or more reactors.

Alternatively said catalytic hydroprocessing may be realized in at least two stages, where in the first stage hydrodeoxygenation (HDO) is carried out and in the second stage hydroisomerization (HI) and/or hydrodewaxing (HDW) is carried out.

The hydroprocessing comprises hydrodeoxygenation, hydrocracking, hydroisomerization and hydrodewaxing reactions on at least one catalyst. In one embodiment at least one catalyst capable of performing the desired reactions may be used. In another embodiment one or more HDO catalysts and one or more HDW/HI catalysts may be combined with each other in at least one catalyst bed of the reactor system. The combination may be provided in different ways such as by mixing or layering. A combination may be provided by physical mixing of catalyst particles or by adding catalyst metals onto the same support. In an embodiment, the catalysts may be arranged in separate catalyst layers situated on top of each other. In another embodiment, the catalysts may be arranged in separate catalyst beds situated in the same reactor. Yet in another embodiment, the catalysts may be arranged in separate reactors.

In another embodiment, the catalysts comprise separate hydrodeoxygenation (HDO) catalyst and hydroisomerizing (HI) catalyst. These catalysts may be arranged in separate layers, in separate beds and in separate reactors, in such a way that the HDO catalyst is arranged upstream from the HI catalyst in the flow direction of the feedstock. The HI catalyst is suitably arranged in a separate reactor downstream from the HDO reactor. Suitably separation of a light gaseous side stream is carried out after the hydrodeoxygenation and/or after the hydroisomerization using outlets.

In the present process the HDO catalyst can be any HDO catalyst known in the art for the removal of hetero atoms (O, S, N) from organic compounds. In an embodiment of the invention, the HDO catalyst is selected from a group consisting of NiMo, CoMo, and a mixture of Ni, Mo and Co. NiMo catalysts are examples of very efficient catalyst in the process. Suitably the HDO catalyst is a supported catalyst and the support can be any oxide which is typically used in the art as support for HDO catalysts. The support is typically selected from $Al_2O_3$, $SiO_2$, $ZrO_2$, zeolites, zeolite-alumina, alumina-silica, alumina-silica-zeolite and activated carbon, and mixtures thereof.

In an embodiment of the invention, solid particles of NiMo/$Al_2O_3$ or, NiMo/$SiO_2$ are used. In another embodiment CoMo/$Al_2O_3$ or CoMo/$SiO_2$ is used. In a further embodiment NiMoCo/$Al_2O_3$ or, NiMoCo/$SiO_2$ is used. It is also possible to use a combination of HDO catalysts.

In an embodiment of the invention, the HDW catalyst is selected from hydrodewaxing catalysts typically used for isomerizing and cracking paraffinic hydrocarbon feeds. Examples of HDW catalysts include catalysts based on Ni, W and molecular sieves.

NiW is a HDW catalyst which is useful in the invention. It has excellent isomerizing and dearomatizing properties and it also has the capacity of performing the hydrodeoxygenation and other hydrogenation reactions of biological feed materials, which are typically performed by HDO catalysts. Aluminosilicate molecular sieves and especially zeolites with medium or large pore sizes are also useful as HDW catalysts in the present invention. Typical commercial zeolites useful in the invention include for instance ZSM-5, ZSM-11, ZSM-12, ZSM 22, ZSM-23 and ZSM 35. Other useful zeolites are zeolite beta and zeolite Y.

The HDW catalyst is also supported on an oxide support. The support materials may be the same as or different from those of the HDO catalyst. In an embodiment of the invention the HDW catalyst is selected from NiW/Al$_2$O$_3$, NiW/Al$_2$O$_3$—SiO$_2$ and NiW/zeolite/Al$_2$O$_3$. These HDW catalysts are especially well suited for combining with the HDO catalyst of the invention since they also require sulfidizing for proper catalytic activity.

In a specific embodiment, a catalyst bed of the main reaction phase of the hydroprocessing reactor system comprises a combination of sulfidized HDO and HDW catalysts, wherein the HDO catalyst is NiMo/Al$_2$O$_3$ and the HDW catalyst is NiW/zeolite/Al$_2$O$_3$. The NiMo/Al$_2$O$_3$ catalyst mainly serves the purpose of hydrogenation, hydrodeoxygenation, hydrodesulfurization and hydrodenitrification. The NiW/zeolite/Al$_2$O$_3$ catalyst mainly serves the purpose of hydroisomerization, hydrogenation, hydrodearomatising, and hydrocracking. However, as mentioned above, NiW has the capacity also for some hydrodeoxygenation, hydrodesulfurization and hydrodenitrification of the feedstock.

In an embodiment of the invention the HDW catalyst is combined with HDO catalyst in the first catalyst bed at the inlet end where the feed enters the main reaction phase. In case there are two or more catalyst beds in the main phase, the HDO and HDW catalysts are typically combined in at least two of the main catalyst beds of the reactor system. Combining of catalysts refers here to mixing, blending, and arranging catalyst layers on top of each other, whereby the boundary layer may comprise a blend of the catalysts.

The proportion of the HDO catalyst at the inlet end of the main reaction phase is typically higher than the proportion of HDW catalyst. In an embodiment of the invention the proportion of the HDW catalyst grows towards the outlet end of the reactor system. The last catalyst bed in the main reaction phase typically comprises only of HDW catalyst.

The proportion of HDO and HDW catalysts in the catalyst combination may vary depending on the feed material and the amount of heteroatoms, aromatic compounds and other impurities therein. The proportion of NiW and zeolite in the NiW/zeolite catalyst may also vary. As a general rule, NiW is the most abundant of the active catalysts in the reactor system. The skilled person will be able to select suitable catalyst compositions based on his knowledge of the feed, the reaction parameters and the desired distillate specification(s). For instance, a feed having a high amount of aromatics will require a relatively higher amount of HDW catalyst for cracking than is necessary for a feed with a low amount of aromatics.

In an embodiment, where the catalytic hydroprocessing is carried out in at least two stages, and the first stage comprises hydrodeoxygenation (HDO) and the second stage comprises hydroisomerization (HI), the HI catalyst is selected from hydroisomerizing catalysts typically used for isomerizing paraffinic hydrocarbon feeds. Suitably the HI catalysts contain a Group VIII metal (e.g. Pt, Pd, Ni) and/or a molecular sieve. Preferred molecular sieves are zeolites (e.g. ZSM-22 and ZSM-23) and silicoaluminophosphates (e.g. SAPO-11 and SAPO-41). The HI catalysts may also contain one or more of the support materials described above. In one embodiment, the HI catalyst comprises Pt, zeolite and/or silicoaluminophosphate molecular sieve, and alumina. The support may alternatively or additionally contain silica.

According to one embodiment the hydroprocessing system also comprises at least one catalytically active guard bed phase upstream of the main reaction phase. The purpose of the guard bed phase is to protect the main phase catalyst(s) from poisoning and fouling. The guard bed phase also prolongs the active operating time of the main phase catalysts. Two or more guard beds are suitably arranged in series in the reactor system. The guard bed(s) may be combined in the same pressure vessel as the main catalyst beds or they may be provided in separate pressure vessel(s).

At least one of the guard beds may contain active catalyst material for the removal of metals and phosphorus present in the feed, and for converting sulfur containing compounds in the feed. The converting of heavy sulfur containing compounds typically begins in the guard beds. Converting of sulfur compounds may be adjusted to provide the sulfur levels in the feed, required for maintaining the activity of the catalysts. The catalytically active materials are typically selected from Ni, Co, Mo, W, zeolites, Al$_2$O$_3$, SiO$_2$ and mixtures thereof. The catalytically active materials in the guard bed(s) may be the same catalysts as the ones in the hydroprocessing reactor(s).

The guard beds and/or the main catalyst beds may comprise an inert layer at the inlet ends of the reactors and also between the catalyst beds. The catalysts may also be diluted with appropriate inert medium(s). Dilution of the active catalysts serves to even out the exothermic reactions and to facilitate temperature control in the reactor(s). Examples of inert media include glass spheres and silica. In one embodiment of the invention, at least one of the catalysts is diluted with an inert material.

According to one embodiment, after optional purification steps(s), the feed is optionally heated and led to the guard bed phase. The guard bed phase may be integrated to the hydroprocessing reactor system or alternatively the guard bed phase may be arranged separately upstream the hydroprocessing reactors. The feed may also be directed to the guard bed phase without heating. Suitably the temperature of the feed is 15-110° C. Typically one or more guard catalyst beds are arranged in series or in parallel. Hydrogen gas is fed into the guard phase either separately or premixed with the feed. The guard bed phase is suitably pressurized and heated in order to provide the desired removal of metals, and phosphorus from the feed.

From the guard phase the flow is fed to the main reaction phase. The main reaction phase may comprise several main catalyst beds operating in series or in parallel in the hydroprocessing reactor system. Typically there are one or two main catalyst beds operating in series. In an embodiment the process is designed to operate in such a way that the feed passes through a series of main catalyst beds as a continuous flow without intermediate outlets for by-products or other side streams. The number and size of the reaction vessels can be freely designed to suit the space available, taking into consideration the desired process and flow parameters. Thus, the main reaction phase may comprise one pressure vessel or it may be split into two or more pressure vessels.

The first main catalyst bed in the flow direction typically contains a combination of HDO and HDW catalysts as described above. Additional hydrogen gas may be fed to the main phase to provide sufficient reagent for the various hydroprocessing reactions.

A number of chemical reactions takes place in the catalyst beds. These reactions are well known as such and are not described in detail herein. The feedstock compounds originating from renewable sources, containing oxygen, sulfur and nitrogen react with the hydrogen and form water, hydrogen sulphide, ammonia, carbon dioxide and carbon monoxide as by-products. The main hydroprocessing products are paraffinic hydrocarbons in the $C_{16}$-$C_{20}$ range. The long carbon chains of the fatty acids are isomerized, which improves the cold flow properties of the resulting fuel. In the present process, according to one embodiment the isomerization takes place before, after or simultaneously with the hydrodeoxygenation due to the combination of HDO and HDW catalysts and the packing of the catalyst material. Olefins and aromatic compounds are hydrogenated and fused ring systems are broken. This reduces the complexity of the compounds and improves the quality of the fuel. Cracking of large molecules, side chains and of some of the long chains occurs, which results in an increase of smaller useful molecules but also causes an increase in light gaseous products (methane, ethane, propane and butane).

Since, in one embodiment, the catalysts are combined in the catalyst bed(s), hydrogenation, isomerization, hydrodeoxygenation, dearomatization and hydrocracking take place simultaneously.

The hydroprocessing reactions are highly exothermic and the temperature can rise to a level which is detrimental to the stability of the catalyst and/or product quality. In some cases it may be necessary to control the temperature variations. Recirculation of at least a portion of the liquid hydrocarbon product stream and/or effluent gas stream and/or hydrogen stream provides an efficient means for constraining the exothermic reaction whereby the recycled streams act as media for lowering the temperature of the catalyst beds in a controlled manner. Said streams may be used for quenching at suitable locations.

From the first catalyst bed in the main reaction phase the flow passes to the second catalyst bed, where the proportion of HDO catalyst is typically lower than in the first catalyst bed. In case there are only two catalyst beds in the reactor system, the second bed may comprise mainly or only HDW catalyst. In case there are several beds, the second bed may comprise also HDO catalyst but in a minor proportion compared to the first bed. Typically the last bed in the series of the main catalyst beds contains only HDW catalyst. This makes it possible to control the isomerization and to adjust the degree of isomerization and cracking to a suitable level according to the required ignition and cold flow properties of the fuel product.

Due to the multifunctional catalyst combination, complex biological feed materials can be broken down into a mixture of hydrocarbons which provides an excellent basis for fuel and fuel components. An example of such feed is CTO, which contains in addition to fatty acids, resin acids and neutral components a number of other organic compounds.

In the present process it is not only the paraffins from the fatty acids which are recovered and transformed into high quality fuel by isomerization. A good yield of the entire feed is obtained by the simultaneously performed dearomatization and cracking.

It is characteristic of the HDO and HDW catalysts used in the present invention that sulfur has to be present to maintain the catalytic activity of the catalysts. The zeolite in the HDW catalyst may be selected from the ones not sensitive to poisoning by low levels of sulfur. The catalysts are typically sulfided before start up by adding sulfur containing compound(s) such as hydrogen sulphide or dimethyl disulphide. Additional sulfur during operation is needed only in case the concentration of organic sulfur in the feed material is too low. When CTO is used as the feed material, additional sulfur is generally not needed to maintain the catalytic activity of the HDO and HDW catalysts. When additional sulfur is needed, suitable sulfur compound may be added to the feed. Further, the first recycle stream may also contain sulfur, which may be used for maintaining the catalytic activity of the HDO and HDW catalysts.

The amount of hydrogen gas needed for the various hydroprocessing reactions depends on the amount and type of the feed material, as well as on the process conditions. Feedstock originating from renewable sources, such as oil, fat and wax typically contains fatty acids and/or triglyceride structures, which are hydrogenated and cracked in the hydrotreatment reaction forming water and long paraffinic carbon chains.

CTO is a feedstock of biological origin, which lacks triglyceride structures but contains fatty acids and other oxygen containing compounds as well as aromatics and olefinic compounds requiring hydrogen for conversion into fuel components.

In the catalytic hydroprocessing the hydrogen partial pressure is maintained in the range from 50 to 250 bar, suitably from 80 to 200 bar, particularly suitably from 80 to 110 bar. The total pressure in the hydroprocessing is from 50 to 250 bar, suitably from 80 to 120 bar.

Hydrogen is supplied to the catalytic hydroprocessing from the hydrogen plant and part of the hydrogen is obtained with the first recycle stream originating from the hydroprocessing reactor, said first recycle stream comprising additionally light hydrocarbons (C1-C5). Methane tends to accumulate in the recycle hydrogen stream, as well as the other light hydrocarbons. In the process hydrogen stream (stream 1 in FIG. 1) and the first recycle stream, (stream 4 in FIG. 1) are combined to form combined stream (stream 6 in FIG. 1). The light hydrocarbons and carbon monoxide possibly present in said combined stream decrease the hydrogen partial pressure in the stream and consequently also in the hydroprocessing reactor. In the present process the concentration of light hydrocarbons and CO in the combined stream is suitably adjusted to maintain the hydrogen partial pressure in the range of 50-250 bar in the hydroprocessing reactor. The concentrations of light hydrocarbons and CO may be monitored continuously using methods known as such in the art.

The hydroprocessing is carried out at a temperature in the range of 280° C. to 450° C., suitably from 350° C. to 400° C.

The feed rate WHSV (weight hourly spatial velocity) of the feedstock to the hydroprocessing system is proportional to the amount of the catalyst. The WHSV of the feed material in the present invention varies between 0.1 and 5, and it is preferably in the range of 0.3-0.7.

The ratio of $H_2$/feed in the present invention depends on feedstock quality and varies between 600 and 4000 Nl/l, suitably of 1300-2200 Nl/l.

According to one embodiment the process may be carried out in at least two separate steps in at least two reactors. In the first step hydrodeoxygenation (HDO) is carried out and in the second step isomerization (HI) is carried out for branching the hydrocarbon chain. Suitably a gaseous side stream containing hydrogen carbon monoxide, carbon dioxide, nitrogen, phosphorus and sulfur compounds, gaseous light hydrocarbons and other impurities is removed from the HDO step. A liquid stream may be withdrawn from between and/or after the HDO catalyst beds and water is removed from the condensed liquid to yield the HDO reaction product. The reaction product from the HDO step is subjected to an isomerization step. The impurities should be removed before the hydrocarbons are contacted with the isomerization catalyst. The isomerization and the HDO may be carried out in the same pressure vessel or in separate pressure vessels. The temperatures, pressures, feed rates and ratio of $H_2$/feed as described above may be used.

In the present integrated process the reaction mixture from the hydroprocessing reactor system is directed to a separator, suitably cold separator, where an aqueous component, a light component comprising hydrogen, light hydrocarbons (C1-C5 hydrocarbons), $H_2S$, CO and $CO_2$ are separated from the heavy component comprising >C5 hydrocarbons and some C1-C5 hydrocarbons. Typically a major part of the light hydrocarbons and almost all of $H_2S$, CO, $H_2O$ and $CO_2$ are separated. The separation may be performed for example by cooling or flashing. Water and gases may also be separated by other means which are well known to those skilled in the art. Suitably a cold product separator is used for the separation of the heavy component comprising heavier >C5 hydrocarbons (stream 2 in FIG. 1) from the light component (stream 8 in FIG. 1). An aqueous component (stream 10 in FIG. 1) is also separated. The light component comprising light gaseous components from the cold separator comprises hydrogen, light hydrocarbons (C1-C5 hydrocarbons), carbon monoxide, carbon dioxide, and hydrogen sulfide.

The light component comprising light gaseous components is directed for purification to a separator capable of removing $H_2S$ and $CO_2$ from the gaseous stream whereby a recycle stream comprising $H_2$ and light hydrocarbons including methane, and if desired some sulfur compounds, is obtained. Examples of such separators are amine scrubbers (amine solution absorbers) and separation units utilizing membrane technology, suitably an amine scrubber is used. The purified stream is directed as first recycle stream to the hydroprocessing reactor system and as a second recycle stream to the desulfurization unit of the hydrogen plant.

Because also $H_2S$ serves a useful purpose in the hydroprocessing reactor system, it may be desirable to recycle the $H_2S$, particularly when feedstocks comprising low amounts or no sulfur are used. At least one or two amine scrubbers may be used, where the first amine scrubber removes both carbon dioxide and hydrogen sulfide. The amine in first amine scrubber is capable of removing carbon dioxide and the sulfur components such as hydrogen sulfide. Suitable amines are for example promoted or activated methyldiethanolamines, where the promoter may be piperazine, and the promoted amine may be used as an aqueous solution. The amine may be regenerated and the carbon dioxide and hydrogen sulfide are then released and removed. The regenerated amine may be recycled and reused. The released carbon dioxide and hydrogen sulfide are passed through a second amine scrubber which contains an amine selective to hydrogen sulfide, but not selective to carbon dioxide. Suitable amines may be regenerated which releases the hydrogen sulfide to be recycled.

The heavy component, that is liquid product comprising hydrocarbons having a carbon number of more than 5, is drawn off from the outlet from the cold separator and subjected to fractionation. Suitably it is fed to a separation column where different fuel grade hydrocarbon fractions are recovered. From the bottom of the separation column, the heavier hydrocarbons may be recycled back to the inlet end of the hydroprocessing reactor system and mixed into the feedstock. The liquid hydrocarbon mixture obtained from the reactor system includes fuel grade hydrocarbons having a boiling point of at most 380° C. according to ISO EN 3405. The person skilled in the art is able to vary the distilling conditions and to change the temperature cut point as desired to obtain any suitable hydrocarbon product.

The recovered middle distillate fraction may comprise gas oil, i.e. a hydrocarbon fraction having a boiling point in the diesel range. A typical boiling point is from 160° C. to 380° C., meeting characteristics of the specification of EN 590 diesel. The diesel product may be fed to a diesel storage tank. Also hydrocarbon fractions distilling at temperatures ranging from 40° C. to 210° C. and at a temperature of about 370° C. can be recovered. These fractions are useful as high quality gasoline fuel and/or naphtha fuel, or as blending components for these fuels. Additionally, fraction suitable as solvents, aviation fuels, kerosene etc. may be obtained.

The process of the present invention can be realized in any typical hydroprocessing reactor system for producing biofuel or biofuel components, integrated with a hydrogen plant comprising a steam reformer unit, a desulfurization unit upstream the steam reformer unit, and water gas shift unit.

A main reaction phase for use in the hydroprocessing may comprise inert layers and trap layers for distributing the flow and/or trap impurities in addition to the active catalyst bed(s) with a combination of HDO and HDW catalysts.

Between the active catalyst beds there may be provided space for the introduction of cooling quench gas. Quench gas may also be introduced into the active bed(s).

The process may additionally comprise any conventional steps, such as separation of gases, scrubbing, washing, cooling, filtering, recovering of intermediates and products, mixing refining and/or fractionation of effluents. These embodiments can be used in combination with all the different embodiments of the invention.

The process may be batch-type or semi-batch-type or continuous, suitably a continuous process is used.

The integrated process of the invention provides several advantages over prior art.

Hydroprocessing of feedstocks originating from renewable sources, such as CTO consumes significant amounts of hydrogen. In processes of the state of the art recycle streams comprising hydrogen are widely used, and typically light hydrocarbons are concentrated in said streams in increasing amounts, whereby the hydrogen partial pressure in said streams is decreased. For compensating the decrease of hydrogen partial pressure more fresh hydrogen is needed and excess of light hydrocarbons are directed to flaring.

In the present integrated process hydrogen contained in the second recycle stream, originating from hydroprocessing is used in the hydrogen plant for providing the necessary hydrogen for desulfurization of the starting material directed to the hydrogen plant, instead of using fresh hydrogen in said desulfurization. Additionally light hydrocarbons in said second recycle stream are converted in the hydrogen plant to hydrogen for use in the hydroprocessing reactions. The light hydrocarbons are saturated hydrocarbons, which are particularly useful in the steam reforming reactions of the hydrogen plant, because less coking and deactivation of the catalyst takes place when compared with unsaturated compounds, and thus no prehydrogenation is needed.

By directing the second recycle stream to the hydrogen plant, the amount of methane and other light hydrocarbons in the first recycle steam directed to the hydroprocessing reactor system can be maintained continuously at a controlled level, and building up of methane and other light hydrocarbons in said stream can be avoided. Thus the hydrogen partial pressure in the first recycle stream can be maintained at desired level. The hydrogen partial pressure required for effecting the desired hydroprocessing reactions can be maintained at an optimal level and products of predefined quality (specific grades) can be obtained. Additionally the amount of hydrogen make-up in the hydroprocessing for maintaining the desired hydrogen partial pressure can be at least decreased. In the process the hydrogen partial pressure in the combined stream (stream 6) is maintained as high as possible and the quality of the hydrocarbon product obtained from hydroprocessing can be maintained at high level.

Flaring can be minimized as methane and light hydrocarbons are utilized as valuable raw materials for producing hydrogen. As the hydrogen partial pressure is controlled more effectively, the use of excess hydrogen is reduced and thus also flaring of hydrogen can be decreased. Further, $CO_2$ emissions and operating costs are reduced.

As hydroprocessing of feedstocks originating from renewable sources, such as CTO yields light hydrocarbons of biological origin, and said hydrocarbons are used as starting material in the hydrogen plant, less starting material of fossil origin is needed to the hydrogen plant, which is clearly a further environmental advantage.

The present invention provides a balanced process for the conversion of feedstocks of biological origin to liquid hydrocarbon products. Particularly, a compact, balanced, integrated, multi-stage process for thermochemically transforming feedstocks of biological origin to into liquid hydrocarbon products is provided, whereby the total consumption of hydrogen can be decreased.

The invention will now be illustrated with the following examples.

EXAMPLES

In the following examples the formation of methane and light hydrocarbons in the hydroprocessing of CTO was evaluated, and their amounts in recycle steams were analyzed. Reduction of hydrogen consumption is calculated by volume in each case. n pilot test runs methane was formed typically in amounts of about 0.5 to 0.9 wt %, calculated from fresh CTO feed (FF). Methane is likely formed of methyl groups attached to rings in resins and neutral substances in CTO. At higher hydrotreating temperatures the amounts of C3 and C4 hydrocarbons are increased due to increased cracking, and they may also originate from the structures in feedstock corresponding to propyl group in abietinic acid.

From the examples it can be seen that the amount of formed methane has significant effect on achievable reduction in hydrogen consumption.

Example 1

CTO was used as the feedstock and the total feeding rate of CTO (stream 1) to the hydroprocessing reactor system was 20000 kg/h (stream 20). 0.56 wt % of methane was formed in hydroprocessing (112 kg/h), and 365 kmol/h of make-up hydrogen was used. 112 g/h of methane was withdrawn with the heavier components (stream 2) separated in the cold separator.

In the light components and gases separated in the cold separator (stream 8):

| | | |
|---|---|---|
| $CH_4$ | 1132 kg/h | 6.3 mol-% |
| C2+ | 1048 kg/h | 2.1 mol-% |
| $CO + CO_2$ | 1058 kg/h | 3.3 mol-% |
| $H_2$ | 2096 kg/h | 93.7 mol-% |
| Tot | 5335 kg/h | 100 mol-% |

In the first recycle stream (stream 4):

| | | |
|---|---|---|
| $CH_4$ target in circulation gas | 6 mol-% | |
| Circulation gas mol flow | 4523 kg/h | 100 mol-% |
| Methane in circulation gas | 960 kg/h | 6 mol-% |
| $CO + CO_2$ in circulation gas | 897 kg/h | 3.1 mol-% |
| C2+ in circulation gas | 889 kg/h | 2 mol-% |
| $H_2$ in circulation gas | 1777 kg/h | 88.8 mol-% |
| Total pressure | 100 bar | |
| Hydrogen partial pressure | 89 bar | |

In the second recycle stream (purge stream to the hydrogen plant) (stream 5):

| | |
|---|---|
| $CH_4$ | 172 kg/h |
| C2+ | 160 kg/h |
| $CO + CO_2$ | 161 kg/h |
| $H_2$ | 319 kg/h |
| Tot | 812 kg/h |

In the combined stream 6 (stream 4 combined with hydrogen stream from the hydrogen plant) hydrogen partial pressure was 92 bar.

Calculated reduction of needed hydrogen in the integrated process was 30% by volume.

Example 2

CTO was used as the feedstock and total feeding rate of CTO to the hydroprocessing reactor system was 20000 kg/h (stream 1). 0.9 wt % of methane was formed in hydroprocessing (180 kg/h), and 365 kmol/h of make-up hydrogen was used. 180 g/h of methane was withdrawn with the heavier components (stream 2) separated in the cold separator.

In the light components and gases separated in the cold separator (stream 8):

| | | |
|---|---|---|
| $CH_4$ | 1820 kg/h | 9.8 mol-% |
| C2+ | 1685 kg/h | 3.3 mol-% |
| $CO + CO_2$ | 1701 kg/h | 5.1 mol-% |
| $H_2$ | 2105 kg/h | 90.3 mol-% |
| Tot | 7310 kg/h | 100 mol-% |

In the first recycle stream (stream 4):

| | | |
|---|---|---|
| $CH_4$ target in circulation gas | 9 mol-% | |
| Circulation gas mol flow | 57784 kg/h | 100 mol-% |
| Methane in circulation gas | 1440 kg/h | 9 mol-% |
| $CO + CO_2$ in circulation gas | 1346 kg/h | 4.7 mol-% |
| C2+ in circulation gas | 1333 kg/h | 3.1 mol-% |
| $H_2$ in circulation gas | 1665 kg/h | 83.3 mol-% |
| Total pressure | 100 bar | |
| Hydrogen partial pressure | 83 bar | |

In the second recycle stream (purge stream to the hydrogen plant (stream 5):

| | |
|---|---|
| $CH_4$ | 380 kg/h |
| C2+ | 352 kg/h |
| $CO + CO_2$ | 355 kg/h |
| $H_2$ | 440 kg/h |
| Tot | 1526 kg/h |

In the combined stream 6 (stream 4 combined with hydrogen stream from the hydrogen plant) hydrogen partial pressure was 88 bar.

Calculated reduction of needed hydrogen in the integrated process was 37% by volume.

Example 3

CTO was used as the feedstock and the total feeding rate of CTO to the hydroprocessing reactor system was 20000 kg/h (stream 1). 0.9 wt % of methane was formed in hydroprocessing (180 kg/h), and 365 kmol/h of make-up hydrogen was used. 180 g/h of methane was withdrawn with the heavier components (stream 2) separated in the cold separator.

In the light components and gases separated in the cold separator (stream 8):

| | | |
|---|---|---|
| $CH_4$ | 2391 kg/h | 15.3 mol-% |
| C2+ | 2214 kg/h | 5.2 mol-% |
| $CO + CO_2$ | 2234 kg/h | 8 mol-% |
| $H_2$ | 1659 kg/h | 84.7 mol-% |
| Tot | 8498 kg/h | 100 mol-% |

In the first recycle stream (stream 4):

| | | |
|---|---|---|
| $CH_4$ target in circulation gas | 14 mol-% | |
| Circulation gas mol flow | 7676 kg/h | 100 mol-% |
| Methane in circulation gas | 2160 kg/h | 13.5 mol-% |
| $CO + CO_2$ in circulation gas | 2018 kg/h | 7 mol-% |
| C2+ in circulation gas | 1999 kg/h | 4.6 mol-% |
| $H_2$ in circulation gas | 1498 kg/h | 74.9 mol-% |
| Total pressure | 110 bar | |
| Hydrogen partial pressure | 82 bar | |

In the second recycle stream (purge stream to the hydrogen plant) (stream 5):

| | |
|---|---|
| $CH_4$ | 231 kg/h |
| C2+ | 214 kg/h |
| $CO + CO_2$ | 216 kg/h |
| $H_2$ | 161 kg/h |
| Tot | 822 kg/h |

In the steam 6 (stream 4 combined with hydrogen stream from the hydrogen plant) hydrogen partial pressure was 90 bar.

Calculated reduction of needed hydrogen in the integrated process was 18% by volume.

The present invention has been described herein with reference to specific embodiments. It is, however clear to those skilled in the art that the process(es) may be varied within the bounds of the claims.

The invention claimed is:

1. An integrated process for producing hydrocarbons, said process comprising the steps of
   hydroprocessing a feedstock originating from renewable sources in a hydroprocessing system in the presence of a catalyst and hydrogen to produce an effluent;
   separating the effluent into an aqueous component, a heavy component comprising hydrocarbons having a carbon number of more than 5, and a light component comprising gases and hydrocarbons having a carbon number of 1 to 5;
   passing the light component to a separation to remove carbon dioxide and hydrogen sulfide to obtain a recycle stream comprising hydrogen and hydrocarbons having a carbon number of 1 to 5;
   dividing the recycle stream into a first recycle stream and a second recycle stream;
   passing the first recycle stream to the hydroprocessing system;
   passing the second recycle stream to a hydrogen plant, wherein the hydrogen plant comprises a steam reformer unit, a desulfurization unit upstream the steam reformer unit, and water gas shift unit;
   converting said hydrocarbons having a carbon number of 1 to 5 to a hydrogen stream in said hydrogen plant; and
   passing the hydrogen stream from the plant to the hydroprocessing system.

2. The integrated process for producing hydrocarbons according to claim 1, wherein natural gas, LPG, naphtha, biogas, methane, ethane, propane, butane or a combination thereof is used as starting material to the hydrogen plant.

3. The integrated process for producing hydrocarbons according to claim 2, wherein the second recycle stream is directed to the desulfurization unit of the hydrogen plant and sulfur compounds are removed from the starting material.

4. The integrated process for producing hydrocarbons according to claim 1, wherein the hydrogen plant comprises additionally a carbon dioxide/carbon monoxide/water separator unit.

5. The integrated process for producing hydrocarbons according to claim 1, wherein the first recycle stream is combined with the hydrogen stream to obtain a combined stream, and the amount of hydrocarbons having carbon number from 1 to 5 in the combined stream is adjusted to the range not more than 30% by mole, calculated from the total amount of feedstock to the hydroprocessing system.

6. The integrated process for producing hydrocarbons according to claim 5, wherein the hydrocarbons having carbon number from 1 to 5 comprise methane.

7. The integrated process for producing hydrocarbons according to claim 1, wherein the light component is subjected to separation using one or more amine scrubbers capable of removing hydrogen sulfide and carbon dioxide.

8. The integrated process for producing hydrocarbons according to claim 1, wherein the separation of the aqueous component, the heavy component, and the light component is carried out using a cold separator.

9. The integrated process for producing hydrocarbons according to claim 1, wherein the heavy component is subjected to separation and/or fractionation to obtain hydrocarbons boiling in the transportation fuel range.

10. The integrated process for producing hydrocarbons according to claim 1, wherein the feedstock originating from renewable source is selected from feedstock originating from plants, animals, algae, fish, microbiological processes, side streams and waste streams originating from processing said feedstocks, and sewage sludge.

11. The integrated process for producing hydrocarbons according to claim 1, wherein the feedstock comprises plant oil, or compounds which are obtained as a by-product from the forest industry, and combinations thereof.

12. The integrated process for producing hydrocarbons according to claim 1, wherein the hydrogen partial pressure in the catalytic hydroprocessing is in the range from 25 to 250 bar.

13. The integrated process for producing hydrocarbons according to claim 1, wherein the total pressure in the catalytic hydroprocessing is from 25 to 250 bar.

14. The integrated process for producing hydrocarbons according to claim 1, wherein the catalytic hydroprocessing is carried out at a temperature from 280 to 450° C.

15. A liquid hydrocarbon product obtainable by the process according to claim 1.

16. The integrated process for producing hydrocarbons according to claim 1, wherein the hydrogen partial pressure in the catalytic hydroprocessing is in the range from 60 to 200 bar.

17. The integrated process for producing hydrocarbons according to claim 1, wherein the hydrogen partial pressure in the catalytic hydroprocessing is in the range from 80 to 150 bar.

18. The integrated process for producing hydrocarbons according to claim 1, wherein the total pressure in the catalytic hydroprocessing is from 80 to 160 bar.

19. An integrated process for converting hydrocarbons having carbon number of 1 to 5 to hydrogen, the process comprising:
hydroprocessing a feedstock originating from renewable sources in a hydroprocessing system in the presence of a catalyst and hydrogen to produce an effluent;
separating the effluent into an aqueous component, a heavy component comprising hydrocarbons having a carbon number of more than 5, and a light component comprising gases and hydrocarbons having a carbon number of 1 to 5;
passing the light component to a separation unit to remove carbon dioxide and hydrogen sulfide to obtain a recycle stream comprising hydrogen and hydrocarbons having a carbon number of 1 to 5;
dividing the recycle stream into a first recycle stream and a second recycle stream,
passing the first recycle stream to the hydroprocessing system;
passing the second recycle stream to a hydrogen plant, wherein the hydrogen plant comprises a steam reformer unit, a desulfurization unit upstream of the steam reformer unit, and a water gas shift unit; and
converting the hydrocarbons having a carbon number of 1 to 5 in said hydrogen plant to hydrogen.

20. The integrated process for converting hydrocarbons having carbon number from 1 to 5 to hydrogen according to claim 19, wherein hydrogen stream comprising said hydrogen converted in said hydrogen plant is directed to the hydroprocessing system.

21. The integrated process for converting hydrocarbons having carbon number from 1 to 5 to hydrogen according to claim 19, wherein natural gas, LPG, naphtha, biogas, methane, ethane, propane, butane or a combination thereof is used as starting material to the hydrogen plant.

22. The integrated process for converting hydrocarbons having carbon number from 1 to 5 to hydrogen according to claim 21, wherein the second recycle stream is directed to the desulfurization unit of the hydrogen plant and sulfur compounds are removed from the starting material.

23. The integrated process for converting hydrocarbons having carbon number from 1 to 5 to hydrogen according to claim 19, wherein the hydrogen plant comprises additionally carbon dioxide/carbon monoxide/water separator unit.

24. The integrated process for converting hydrocarbons having carbon number from 1 to 5 to hydrogen according to claim 19, wherein the light component is subjected to separation using one or more amine scrubbers capable of removing hydrogen sulfide and carbon dioxide.

25. The integrated process for converting hydrocarbons having carbon number from 1 to 5 to hydrogen according to claim 19, wherein the feedstock originating from renewable source is selected from feedstock originating from plants, animals, algae, fish, microbiological processes, side streams and waste streams originating from processing said feedstocks, and sewage sludge.

26. The integrated process for converting hydrocarbons having carbon number from 1 to 5 to hydrogen according to claim 19, wherein the feedstock comprises plant oil, or compounds which are obtained as a by-product from the forest industry, and combinations thereof.

\* \* \* \* \*